March 17, 1970   P. MADSEN   3,501,013
FILTER ASSEMBLY AND METHOD OF MANUFACTURING SAME
Filed Nov. 7, 1968

INVENTOR
PER MADSEN
BY William F. Thornton
ATTORNEY

United States Patent Office 3,501,013
Patented Mar. 17, 1970

3,501,013
FILTER ASSEMBLY AND METHOD OF MANUFACTURING SAME
Per Madsen, Detroit, Mich., assignor to The Bendix Corporation, a corporation of Delaware
No Drawing. Filed Nov. 7, 1968, Ser. No. 774,155
Int. Cl. B01d 29/06
U.S. Cl. 210—497                     4 Claims

ABSTRACT OF THE DISCLOSURE

A filter assembly consisting of a tubular filter element formed of pleated wire cloth and end caps brazed to the ends of the filter element. Each end cap is attached by positioning a layer of porous metal material, such as stainless steel felt, against the adjacent end face of the filter element. A braze material is located between and in engagement with the layer and the end cap following which the braze material is heated sufficiently to cause it to permeate through the porous metal layer into the end face a distance sufficient to form a fluid tight joint between the end cap and the filter end face. The porous metal layer causes the braze material to distribute evenly and form a tight integral joint between the end cap and the filter element using a minimum amount of braze material.

---

It is an object of this invention to provide an improved filter assembly wherein the end caps are brazed to the filter element and an improved method of manufacturing filter assemblies of this type.

Filter assemblies of the type wherein end caps are brazed to the ends of pleated wire cloth filter elements are well known. However, because of the tendency of the braze material to wick into the porous filter element it has been difficult to obtain the necessary fluid tight connection between the end caps and the filter element. Unless a very close tolerance is maintained between the end cap and the element, the necessary capillary force for maintaining the braze material in the element-end cap interface is absent and the braze material wicks into the element. In other words, if there is a void any place between the end cap and the filter element end face, the braze material tends to be drawn away from the end cap by capillary action into the porous filter element, thereby causing a leak at the resulting void. The finer the filter rating of the element, the more pronounced this wicking tendency.

In the filter assembly of this invention, a porous metal layer, of higher melting point than the braze material and having a porosity comparable to the porosity of the filter element, is positioned at the braze interface. More specifically, the braze material is positioned between the porous metal layer and the end cap, with the porous metal layer in engagement with the filter element end face. On heating of the braze material to its melting point, the material adheres to the end cap and permeates through the porous metal layer into the filter element end face. By virtue of the inclusion of the porous metal layer between the braze material and the filter element end face, the tendency of the braze material to wick into the filter element and be drawn away from the end cap is reduced and the braze material is evenly distributed at the end cap-filter element interface so as to make a tight integral joint. In addition, a minimum amount of braze material can be employed in each instance.

Figure 1:
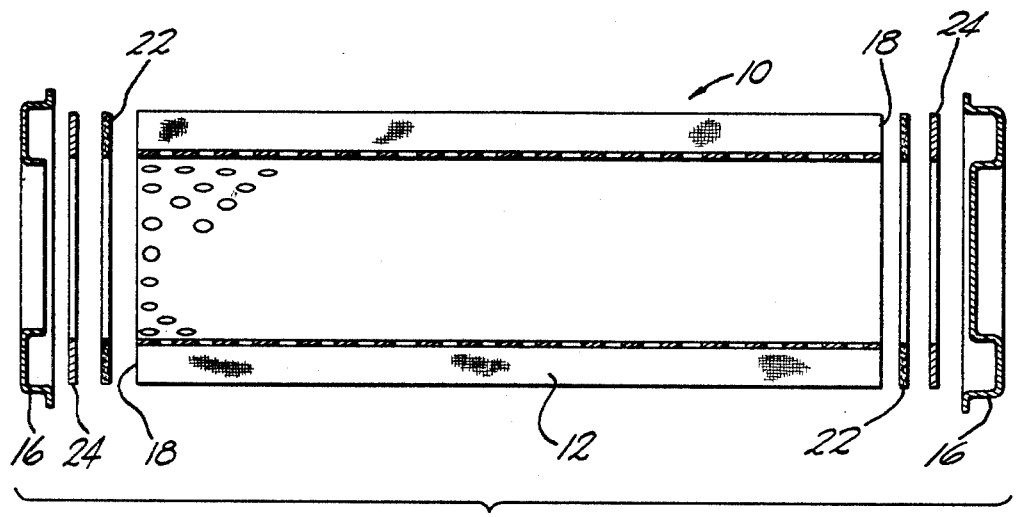
Figure 2:
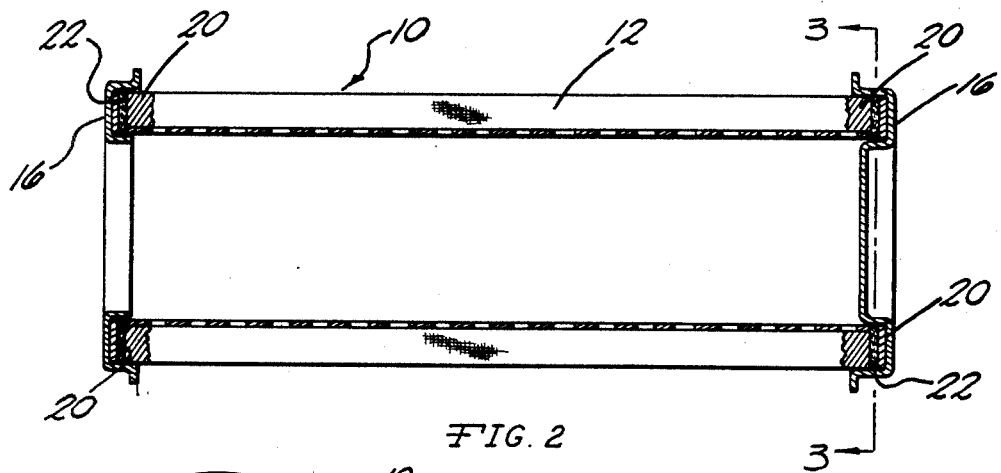
Figure 3:
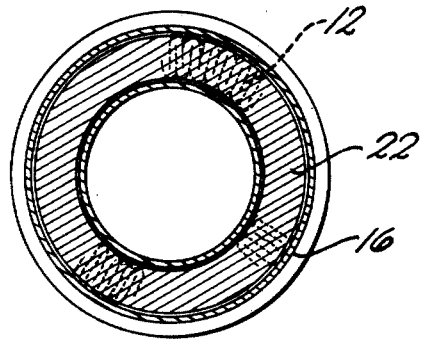

Further objects, features and advantages of this invention will become apparent from a consideration of the following description, the appended claims, and the accompanying drawing in which:

FIGURE 1 is an exploded longitudinal sectional view of the filter assembly of this invention;
FIGURE 2 is a longitudinal sectional view of the filter assembly of this invention; and
FIGURE 3 is a transverse sectional view of the filter assembly of this invention as seen from the line 3—3 in FIG. 2.

With reference to the drawing, the filter assembly of this invention, indicated generally at 10, is illustrated in FIGS. 1 and 2 as including a generally tubular filter element 12 of the conventional pleated wire cloth type, a supporting perforated core 14 and end caps 16. The end caps 16 are secured in fluid tight relation to the opposite end faces 18 of the filter element 12 by a suitable metal brazing alloy 20 which, as shown in FIG. 2, is positioned at the element-end cap interface and permeates into the ends of the filter element 12.

In the manufacture of the filter assembly 10, an annular washer shape member 22, formed of a soft porous metal material, such as stainless steel metal felt, is positioned against an element end face 18. An annular member 24 of similar shape and formed of the braze material 20 is positioned against the metal layer 22 and the end cap 16 is positioned as shown in FIG. 2 so that it engages the braze member 24. The braze member 24 is then heated, by any suitable means, to its melting point causing it to permeate through the layer 22 into the end face 18 and adhere to the end cap 16. The result is a tight integral joint between the end cap 16 and the filter element end face 18 by virtue of the layer 22 functioning to prevent the braze material 20 from wicking into the filter element 12.

It will be understood that the filter assembly and method of manufacturing same which are herein disclosed and described are presented for purposes of explanation and illustration and are not intended to indicate limits of the invention, the scope of which is defined by the following claims.

I claim:
1. A filter assembly comprising a substantially tubular filter element formed of wire cloth and having an axis and an annular end face extending completely around said axis, a metal end cap at said end face of said filter element, an annular layer of porous metal material interposed between said end cap and said one end face of said element, and a metal braze material extending between said end cap and said wire cloth, said braze material being adhered to said end cap and extending through said layer into permeating relation with said end face so as to form a fluid tight joint between said end cap and said element extending completely around said axis.
2. The structure according to claim 1 wherein said braze material has a lower melting point than said porous metal material.
3. The structure according to claim 2 wherein said porous metal material is a steel felt material.
4. The method of securing a metal end cap to the end face of a filter element formed of wire cloth in the manufacture of a filter assembly comprising the steps of:
(a) positioning a layer of porous material against said end face;
(b) locating a braze material between and in engagement with said layer and said end cap; and
(c) heating said braze material sufficiently to cause said material to adhere to said end cap and permeate through said layer into said end face a distance sufficient to form a fluid tight joint between said end cap and said end face.

References Cited

UNITED STATES PATENTS

| | | | |
|---|---|---|---|
| 2,202,403 | 5/1940 | Sandberg | 210—499 X |
| 2,640,789 | 6/1953 | Hausner | 210—499 X |
| 3,000,505 | 9/1961 | Scavuzzo | 210—457 X |
| 3,007,238 | 11/1961 | Pall | 210—493 X |
| 3,308,958 | 3/1967 | Berger et al. | 210—493 X |
| 3,426,910 | 2/1969 | Winzen | 210—493 |

REUBEN FRIEDMAN, Primary Examiner

C. DITLOW, Assistant Examiner

U.S. Cl. X.R.

29—489, 501; 210—499